No. 780,706. PATENTED JAN. 24, 1905.
O. G. & O. K. COLE.
FLOUR SIFTER.
APPLICATION FILED APR. 13, 1904.

Witnesses
John W. Wheeler.

Inventors
O. G. Cole and O. K. Cole.
By
R. H. & A. B. Lacey, Attorneys

No. 780,706. Patented January 24, 1905.

UNITED STATES PATENT OFFICE.

OLIVER G. COLE AND OLIVER K. COLE, OF TURNER, OREGON.

FLOUR-SIFTER.

SPECIFICATION forming part of Letters Patent No. 780,706, dated January 24, 1905.

Application filed April 13, 1904. Serial No. 203,004.

*To all whom it may concern:*

Be it known that we, OLIVER G. COLE and OLIVER K. COLE, citizens of the United States, residing at Turner, in the county of Marion and State of Oregon, have invented certain new and useful Improvements in Flour-Sifters, of which the following is a specification.

This invention provides a simple and cheap construction of flour-sifter particularly adapted for home use for sifting the flour in small quantities.

The essential feature of the invention resides in a peculiar form of agitating device mounted within the sifter which facilitates the sifting operation, therefore increasing the general desirability of the article.

The sifter is designed to be used also in the capacity of a fruit-strainer, being of a construction suitable for said purposes, as will be more fully noted hereinafter.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1:
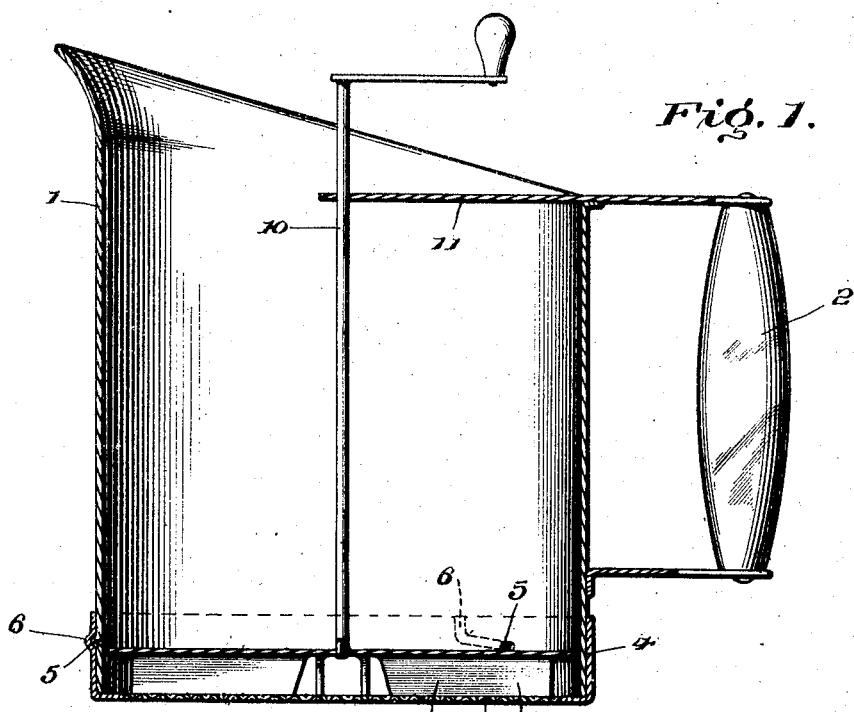
Figure 2:
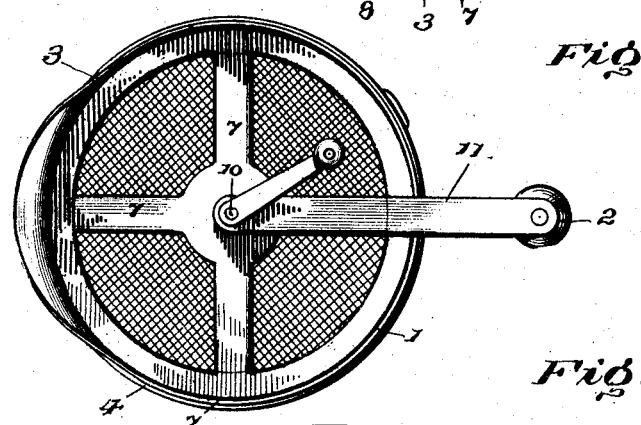
Figure 3:
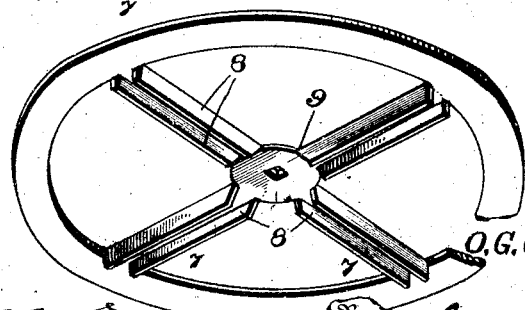

Figure 1 is a vertical sectional view through a flour-sifter embodying our invention. Fig. 2 is a top plan view. Fig. 3 is a detail perspective view of the agitating means, bringing out more clearly the exact construction of this part.

Corresponding and like parts are referred to in the following description and indicated in all the views of the drawings by the same reference characters.

In general form our sifter is substantially the same as are those now in common use, being of a size sufficient to hold enough flour for ordinary baking purposes. The invention comprises the receptacle or cylinder 1, which receives the flour, and a handle 2 projects laterally from the cylinder, the latter being grasped in supporting the sifter when in operation. The sifting sieve or screen 3 is removably applied to the receptacle 1, being carried by a ring or like annular member 4, which latter is detachably secured to the lower portion of the said receptacle 1. The sieve or screen 3 is attached to the ring 4 in any suitable manner and is preferably of flat form. Lugs 5 are projected laterally from the lower portions of the receptacle 1, and these lugs are adapted to be engaged with angular grooves 6, formed in the ring 4, in securing the latter in position upon the receptacle.

The peculiar form of agitating device utilized in our invention, which is specially constructed with a view to quickly sifting the flour, is composed of horizontally-disposed diagonal strip provided with downwardly-extending vergent arms 7, each of which is composed of vertical flanges or flights 8. The flanges or flights 8 are integral with the arms 7 and are formed by bending the edge portions of said arms longitudinally thereof. The flanges 8 further constitute scraping devices which engage the screen or sieve support 3 and effectually promote the sifting of the flour passing through this part 3. It is designed that the arms 7, which are connected at the central portion thereof, as shown at 9, be stamped from an integral plate in the practical manufacture of this part of the device, the said part being at the same time cut so as to readily admit of formation of the downwardly-projecting scraping flanges or members 8. The formation of the arms admits of a very cheap construction of agitating device, which cheapens the general cost of the article to no small extent. The agitating device rests directly upon the sieve or screen 3, and the scraping-flanges 8 directly engage the said screen in the operation of the sifter.

The agitating device is rotated in the sifting operation by means of a crank-shaft 10, which latter is suitably connected with the central portion 9 so as to impart the necessary movement to the diverging arms which carry the scraping-flanges 8. The crank-shaft is supported by means of its connection with the agitating device, and the upper portion of the crank is received by an extension 11, forming a part of an upper arm 11$^a$, supporting the handle 2, said extension being projected inwardly from the sides of the receptacle 1. A lower arm 11$^b$ also connects the handle 2 with the receptacle 1. An operating-handle 12 is mounted upon the upper end of the crank-shaft 10, and this part is manipulated in sifting the flour in a manner which will be readily apparent to those cognizant with this part of the invention.

The removable sieve or screen structure is especially useful for cleaning purposes, particularly when the device is utilized as a fruit-strainer. When it is desired to clean the agitating device or the sieve proper, it is only requisite to detach the ring 4 by a slight rotary movement thereof, and ready access may be thus had to the several interior parts.

The divergent arms 7 are connected at their outer ends by an annular rim 14, which is integrally formed with the arms, being stamped from the same metallic blank that the scraping device is produced from. The rim 14 lends a greater rigidity to the divergent arms 7 in a manner which will be readily seen, greatly strengthening these arms in the practical operation of the agitating device.

Having thus described the invention, what is claimed as new is—

In combination, a screen, an agitator comprising a central portion, a ring concentric therewith, arms between said central portion and ring and having their longitudinal edge portions bent about at a right angle to the plane of the agitator toward the screen to form flights, and an operating-shaft attached to the central portion of the agitator, substantially as specified.

In testimony whereof we affix our signatures in presence of two witnesses.

OLIVER G. COLE. [L. S.]
          OLIVER K. COLE. [L. S.]

Witnesses:
    GEO. MOORE,
    F. C. GUNNING, Jr.